April 1, 1930.  H. A. ZIOLA  1,752,769

COOKER

Filed June 25, 1928

INVENTOR.
H. A. Ziola.
BY Robert Robb
ATTORNEYS

Patented Apr. 1, 1930

1,752,769

UNITED STATES PATENT OFFICE

HENRY A. ZIOLA, OF TOLEDO, OHIO, ASSIGNOR TO THE SWARTZBAUGH MANUFACTURING COMPANY, OF TOLEDO, OHIO, A CORPORATION.

COOKER

Application filed June 25, 1928. Serial No. 288,022.

This invention relates to improvements in cooking utensils and more particularly to the type adapted for surmounting above a flame or other source of heat.

An essential object in view is the effective distribution of the heat for creating and retaining uniformity of temperature of the contents of a utensil, and a further object is the accomplishment of such distribution by apparatus shaped to simulate a known type of an electric cooker.

With these and further objects in view as will in part hereinafter become apparent and in part be stated, the invention comprises certain novel constructions, combinations and arrangements of parts as subsequently specified and thereafter particularly pointed out in the claims.

In the accompanying drawings,—

Figure 1:
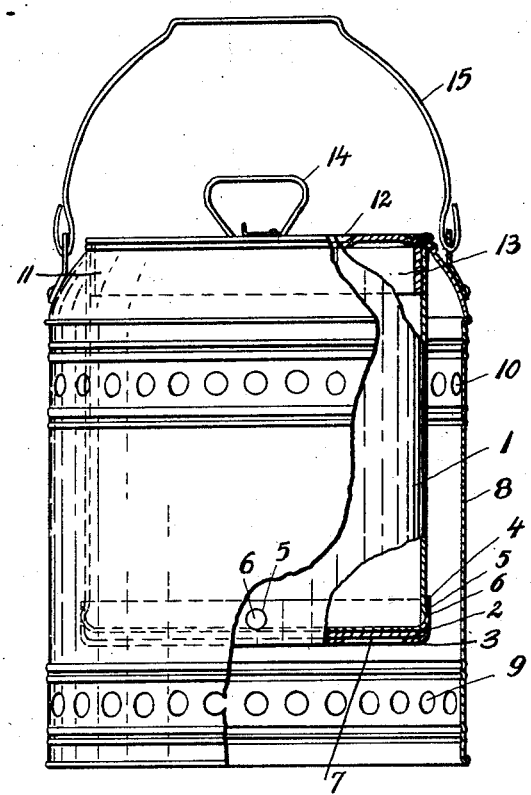
Figure 1 is a view partly in side elevation and partly in vertical section of a structure embodying features of the present invention.
Figure 2:
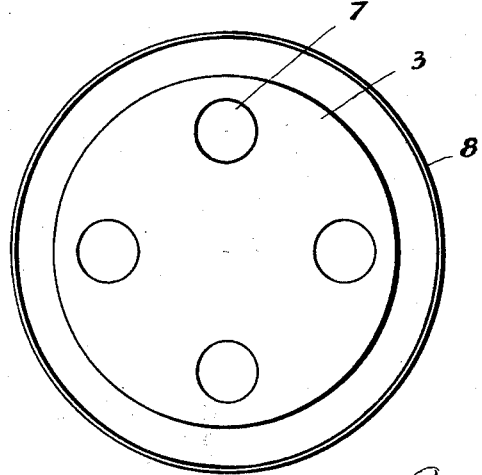
Figure 2 is an inverted plan view thereof.

In the control and distribution of heat from a flame such as the flame of an ordinary gas stove, it has heretofore been proposed to employ the heat distributing or insulating base to a cooking utensil, but such proposed devices have tended to deflect the heat so that the benefit of a large proportion thereof has been lost. The present invention provides a means for retarding too rapid progress of heat units through the bottom of the utensil by means which cause a proportional deflecting of heat, and then provides for the confining of the thus deflected heat to direct it and maintain it in contact with the sides of the utensil and to distribute it through the utensil and its contents and thence gradually dissipate it by diffusion.

In greater detail, the invention as indicated by the preferred embodiment illustrated in the accompanying drawing, includes the provision of a receptacle 1 which may be of any appropriate material. Aluminum is found to be especially acceptable for the purpose. Beneath the bottom of the receptacle 1 is arranged a heat insulating disc 2 as for instance a disc of asbestos. Disc 2 is mounted in position by a pan 3 which pan is formed with an annular up-turned flange 4. Flange 4 is apertured at 5—5 for the passage therethrough of lateral lugs 6 outstanding from the receptacle 1.

The lugs 6 may be provided in any of various ways. The preferable manner of producing lugs 6 is by stamping them out of the material from the vertical walls of receptacle 1. The pan 3 is preferably of material of higher resistance to the erosion of a flame and may be made of heavy gauge sheet iron. The flange 4 when the parts are being assembled is merely slipped over the lower end of receptacle 1 and caused to spring past the lugs 6 until the several lugs enter the several openings 5. As soon as this is accomplished, the pan 3 is firmly locked in place. To permit access of some parts of the flame directly to the insulating pad 2, the pan 3 may be formed with apertures 7.

Completely surrounding the receptacle 1, is a jacket 8 which may be of sheet iron or other appropriate material and is spaced from the receptacle 1 sufficiently for allowing adequate area for the distribution of heat deflected by the pan 3 while confining such heat to sufficiently close proximity to the side walls of receptacle 1 as to insure effective distribution of the deflected heat to the contents of the receptacle 1 at upper portions thereof.

Near the lower end of jacket 8, the jacket is provided with a series of openings 9 for the admission of air to aid in the support of the combustion forming the source of heat for the receptacle 1. Near the upper end of the jacket 8, said jacket is formed with a like series of apertures 10 for the exhaustion of hot air and burnt products. The arrangement of apertures 9 and 10 insures a draft or chimney between the jacket 8 and receptacle 1 so as to insure constant and effective delivery to the sides of receptacle 1 of heat deflected from the pan 3.

The jacket 8 is constricted at its upper end portion, being formed to an inwardly curved terminal annular shoulder 11 upon which the upper end portion of receptacle 1 fixedly or detachably rests. The lower end of receptacle 1 is spaced above the lower end of jacket 8. This last spacing is sufficient to allow the jacket 8 to be placed over a flame, such as that of an ordinary gas burner and thereupon enables the flame to contact with the pan 3.

The upper end of receptacle 1 is formed open and is closed by an appropriate cap or closure 12. The cover 12 is preferably provided with a depending annular flange 13 adapted to snugly fit within the upper end portion of receptacle 1 and any appropriate handle 14 is provided for the cover 12.

Any appropriate handle also may be provided for the jacket or casing 8, such, for example, as a bail 15, and it is notable that the entire apparatus is a unit subject to be handled effectively by the handling of the jacket or casing 8 so that the utensil is easily portable and convenient for handling.

The lower end of the jacket 8 is left open and especially constructed to enable it to readily be applied over an ordinary gas burner or like source of heat. The entire apparatus may be picked up by the operator grasping the handle 15 and the device may be thereby shifted to and from the position in operative relation to a gas burner or the like. Also the jacketing of the receptacle will aid in maintaining the heat within the material heated in receptacle 1 longer than would otherwise occur.

Having thus described my invention, what I claim is—

1. A unitary cooking device of the character described, comprising a jacket having a heat receiving bottom opening, a vessel fastened to the upper end of the jacket and disposed within and spaced from the wall of said jacket, said jacket having means for causing a draft upwardly through said space, the base of said vessel being disposed above the base of the jacket, and means secured to the base of the vessel to prevent direct contact of a flame with said base.

2. A unitary cooking device of the character described, comprising a jacket having a heat receiving bottom opening, a vessel fastened to the upper end of the jacket and disposed within and spaced from the wall of said jacket, said jacket having means for causing a draft upwardly through said space, the base of said vessel being disposed above the base of the jacket, and means removably secured to the base of the vessel to prevent direct contact of a flame with said base.

In testimony whereof I affix my signature.

HENRY A. ZIOLA.